United States Patent
Grobman

(10) Patent No.: US 7,845,009 B2
(45) Date of Patent: Nov. 30, 2010

(54) METHOD AND APPARATUS TO DETECT KERNEL MODE ROOTKIT EVENTS THROUGH VIRTUALIZATION TRAPS

(75) Inventor: Steven Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1165 days.

(21) Appl. No.: 11/435,463

(22) Filed: May 16, 2006

(65) Prior Publication Data

US 2007/0271610 A1 Nov. 22, 2007

(51) Int. Cl.
G06F 21/22 (2006.01)
G06F 11/30 (2006.01)
G06F 9/445 (2006.01)

(52) U.S. Cl. .......................................... 726/24; 718/1
(58) Field of Classification Search ........................ None
See application file for complete search history.

(56) References Cited

U.S. PATENT DOCUMENTS

| | | | | |
|---|---|---|---|---|
| 6,907,533 B2 * | 6/2005 | Sorkin et al. | ................... | 726/22 |
| 6,981,155 B1 * | 12/2005 | Lyle et al. | ..................... | 726/22 |
| 7,356,844 B2 * | 4/2008 | Lyle et al. | ..................... | 726/23 |
| 7,424,710 B1 * | 9/2008 | Nelson et al. | ................... | 718/1 |
| 7,607,173 B1 * | 10/2009 | Szor et al. | ..................... | 726/25 |
| 7,640,543 B2 * | 12/2009 | Vij et al. | ......................... | 718/1 |
| 2005/0080753 A1 * | 4/2005 | Vega et al. | .................... | 706/21 |
| 2005/0081199 A1 * | 4/2005 | Traut | .............................. | 718/1 |
| 2006/0005184 A1 * | 1/2006 | Tewari et al. | ................... | 718/1 |
| 2006/0095904 A1 * | 5/2006 | Gardner | ......................... | 718/1 |
| 2007/0079178 A1 * | 4/2007 | Gassoway | ..................... | 714/38 |
| 2008/0244114 A1 * | 10/2008 | Schluessler et al. | ........... | 710/24 |

OTHER PUBLICATIONS

K.G. Anagnostakis, S. Sidiroglou, P. Akritidis, K. Xinidis, E. Markatos, and A.D. Keromytis. Detecting Targeted Attacks Using Shadow Honeypots. In Proceedings of the 2004 USENIX Security Symposium, Aug. 2005.

T. Garfinkel and M. Rosenblum. A Virtual Machine Introspection Based Architecture for Intrusion Detection. In Proceedings of the 2003 Network and Distributed System Security Symposium (NDSS), Feb. 2003.

A. Joshi, S.T. King, G.W. Dunlap, and P.M. Chen. Detecting past and present intrusions through vulnerability-specific predicates. In Proceedings of the 2005 Symposium on Operating Systems Principles (SOSP), pp. 91-104, Oct. 2005.

Samuel T. King, Peter M. Chen, University of Michigan and Yi-Min Wang, Chad Verbowski, Helen J. Wang, Jacob R. Lorch, Microsoft Research. SubVirt: Implementing malware with virtual machines.

* cited by examiner

*Primary Examiner*—Christopher A Revak
(74) *Attorney, Agent, or Firm*—Caven & Aghevli LLC

(57) ABSTRACT

Detecting a rootkit in a computing system may be achieved by detecting, by a virtual machine monitor, a virtualization trap occurring as a result of an action by a rootkit executing in a computing system; and analyzing the virtualization trap to detect the presence of the rootkit in the computing system. Action may then be taken to block the rootkit activity to safeguard the computing system.

27 Claims, 3 Drawing Sheets

METHOD AND APPARATUS TO DETECT KERNEL MODE ROOTKIT EVENTS THROUGH VIRTUALIZATION TRAPS

BACKGROUND

1. Field

The present invention relates generally to computer security and, more specifically, to using virtualization in processor architectures to deter and detect usage of rootkits.

2. Description

A battle is taking place between attackers and defenders of computer systems. An attacker who manages to compromise a computer system seeks to carry out malicious activities on that system while remaining invisible to defenders. The attacker tries to monitor, intercept, and/or modify the state and actions of software on the system. At the same time, defenders actively search for attackers by looking for signs of system compromise or malicious activities.

Some attackers use a "rootkit" to attack a computer system. A rootkit is a set of small and useful computer programs that allow a permanent and undetectable presence on a computer system. A rootkit seeks to maintain access to "root," the most powerful user on a computer system. Rootkits are often disguised as device drivers. Rootkits use many tricks and techniques to hide code and data on a system, and may also include methods for remote access and eavesdropping (such as sniffing network packets, keystroke sniffing, capturing passwords and decrypted files, and so on). Rootkits often work by modifying legitimate code via patching, "Easter eggs" and back doors, covert installation of spyware, or source code modification techniques. Some rootkits operate in user mode on a personal computer (PC) system, while other rootkits operate in kernel mode. Well written kernel mode rootkits are especially difficult to detect since they run at the highest processor privilege level.

In response, intrusion detection software seeks to detect rootkits installed on a computer system through various techniques. However, it is difficult for current approaches in intrusion detection software to stay ahead of the rapidly evolving threats of the attackers. New system-wide advances are needed.

BRIEF DESCRIPTION OF THE DRAWINGS

The features and advantages of the present invention will become apparent from the following detailed description of the present invention in which.

DETAILED DESCRIPTION

Embodiments of the present invention provide a method and apparatus for enabling detection of kernel mode rootkit events through virtualization traps in a computing platform. Embodiments of the invention utilize the concept of virtualization traps to enhance the detection capabilities of rootkit detection software. Virtualization technology may be programmed to "trap" when guest software components execute certain commands or cause certain events. Some of these events are the same actions that many advanced kernel mode rootkits execute, such as modifying the Interrupt Descriptor Table (IDT), the Global Descriptor Table (GDT), the Local Descriptor Table (LDT), or control registers in the processor. Additionally, a virtual machine monitor (VMM) has the ability to set traps when certain pages of memory are accessed, and can read/modify all memory in each guest OS.

In one embodiment, a "virtual appliance" capability that is trusted within a light weight client virtualization architecture works in cooperation with the VMM to be notified of the occurrence of certain events and ascertains whether the activity is legitimate or a rootkit activity. This analysis may be performed by examining the data passed by a trap. Additionally, the virtual appliance can request that some analysis be done within the VMM itself to enhance performance.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
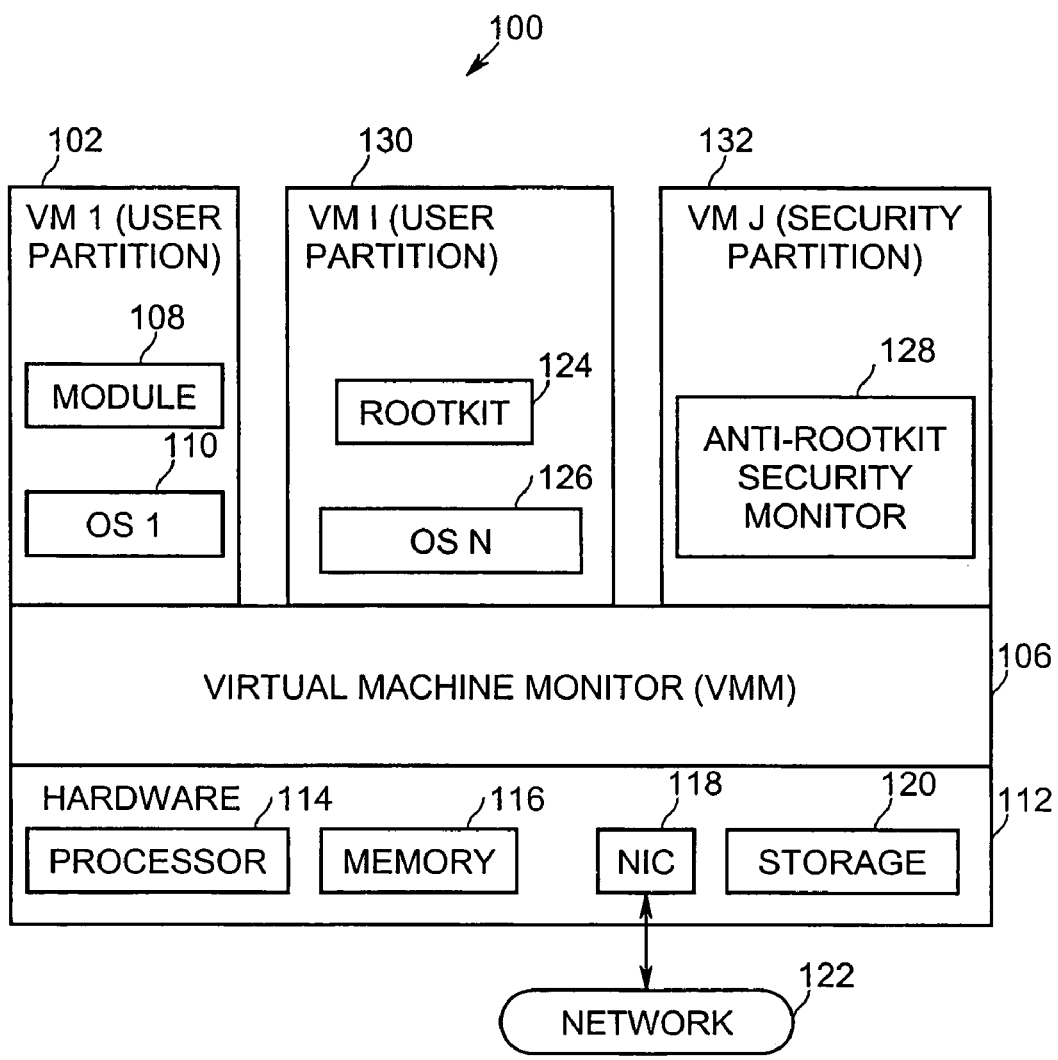
FIG. 1 illustrates a computing platform in accordance with an embodiment of the present invention.

FIG. 1 illustrates a computing platform 100 to provide for enabling detection of kernel mode rootkit events through virtualization traps in accordance with an embodiment of the present invention. In one embodiment, computing platform 100 includes three virtual machines VM1 102, VM I 130, VM J 132, and a virtual machine monitor (VMM) 106. In various embodiments, there may be any number of virtual machines in the computing platform.

Virtualization enables a single host machine with hardware and software support for virtualization to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems may include a virtual machine monitor (VMM) 106 which controls the host machine. The VMM provides guest software operating in a virtual machine with a set of resources (e.g., processors, memory, IO devices). The VMM may map some or all of the components of a physical host machine into the virtual machine, and may create fully virtual components, emulated in software in the VMM, which are included in the virtual machine (e.g., virtual IO devices). By directly mapping hardware to a guest, the OS can directly control the device and use native drivers as if the OS was running without virtualization present. The VMM uses facilities in a hardware virtualization architecture to provide services to a virtual machine and to provide protection from and between multiple virtual machines executing on the host machine.

As guest software executes in a virtual machine, certain instructions executed by the guest software (e.g., instructions accessing peripheral devices) would normally directly access hardware, were the guest software executing directly on a hardware platform. In a virtualization system supported by a VMM, these instructions may cause a transition (also called a trap) to the VMM, referred to herein as a virtual machine exit. The VMM handles these instructions in software in a manner suitable for the host machine hardware and host machine peripheral devices consistent with the virtual machines on which the guest software is executing. Similarly, certain interrupts and exceptions generated in the host machine may need to be intercepted and managed by the VMM or adapted for the guest software by the VMM before being passed on to the guest software for servicing. The VMM then transitions control to the guest software and the virtual machine resumes operation. The transition (or trap) from the VMM to the guest software is referred to herein as a virtual machine entry.

VM 1 102, operating as a "user partition," may include a module 108 and an operating system 1 110. The OS 110 may be a component configured to execute and control the general operation of other components within VM 1 102, such as module 108. A module may be any software component.

As used herein, the term "module" is intended to refer to programming logic and associated data that may be employed to obtain a desired outcome. The term module may be synonymous with "component" or "agent" and may refer to programming logic that may be embodied in hardware or firmware, or in a collection of software instructions, possibly having entry and exit points, written in a programming language, such as, for example, C++, Intel Architecture 32-bit (IA-32) executable code, etc.

A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the modules described herein are implemented as software modules, but nonetheless may be represented in hardware or firmware. Furthermore, although only a given number of discrete software/hardware modules may be illustrated and/or described, such modules may nonetheless be represented by additional modules or fewer modules without departing from the spirit and scope of embodiments of the invention.

VMM 106 may arbitrate general component access to computing hardware 112 resources of the computing platform such as one or more processor(s) 114, memory 116, network interface controller (NIC) 118, storage 120, or other conventional devices not shown in FIG. 1.

The processor(s) 114 may execute programming instructions of components of the computing platform 100. The processor(s) 114 may be single and/or multiple-core processor(s), controller(s), application specific integrated circuit(s) (ASIC(s)), etc.

In an embodiment, storage 120 may represent non-volatile storage to store persistent content to be used for the execution of the components on the platform 100, such as, but not limited to, operating system(s), program files, configuration files, etc. In an embodiment, storage 120 may include stored content, which may represent the persistent store of source content for module 108 or any other modules in the various virtual machines. The persistent store of source content may include, e.g., executable code store that may have executable files and/or code segments, links to other routines (e.g., a call to a dynamic linked library (DLL)), a data segment, etc.

In various embodiments, storage 120 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 120 may be a storage resource physically part of the platform 100 or it may be accessible by, but not necessarily a part of, the platform 100. For example, the storage 120 may be accessed by the platform 100 over a network 122 via the network interface controller 118.

Upon a load request, e.g., from a loading agent of the OS 110, the VMM 106 and/or the OS 110 may load stored content from storage 128 into memory 116 as active content for operation of the module in the computing platform.

In various embodiments, the memory 116 may be volatile storage to provide active content for operation of components on the platform 100. In various embodiments, the memory 116 may include RAM, dynamic RAM (DRAM), static RAM (SRAM), synchronous DRAM (SDRAM), dual-data rate RAM (DDRRAM), etc.

In some embodiments the memory 116 may organize content stored therein into a number of groups of memory locations. These organizational groups, which may be fixed and/or variable sized, may facilitate virtual memory management. The groups of memory locations may be pages, segments, or a combination thereof.

A virtual memory utilizing paging may facilitate the emulation of a large logical/linear address space with a smaller physical memory page. Therefore, the computing platform may provide a virtual execution environment (in the form of virtual machines) in which the components may operate, which may then be mapped into physical pages of the memory 116. Page tables maintained by the OS 110 and/or VMM 106 may map the logical/linear addresses provided by modules to physical addresses of the memory 116.

Another VM in the system, such as VM I 130, may include multiple modules, such as rootkit 124 and OS N 126. Yet another VM, such as VM J 132, may include anti-rootkit security monitor 128. In various embodiments, the anti-rootkit security monitor, or portions thereof, may be selected for partitioning and the VMM 106 may identify and partition off portions of the anti-rootkit security monitor to control access to this module. Partitioned portions may include any portion, up to all, of the particular module. A partitioned portion may be sequestered, either physically or virtually, from other modules within the same execution environment, such that intra-execution environment accesses may be monitored and restricted, if necessary. Partitioning may facilitate insulation of, e.g., anti-rootkit security monitor 128 from the OS N 126 and the rootkit 124, without requiring that the anti-rootkit security monitor operate in an entirely separate execution environment, with a separate OS. Partitioning may also afford the anti-rootkit security monitor a level of protection from other modules, even those of similar or higher privilege levels, within VM J 132 that may be compromised in some manner, e.g., by the rootkit, other malware, critical runtime failures, etc.

In at least one embodiment, at least two partitions are set up in the computing platform. A first partition, called a user partition, may be included in VM I 130 and may be used by the user to run application programs. The user partition may be optimized for performance and maximum exposure to computing platform capabilities and devices. The user partition includes an OS N 126. Rootkit 124 comprises a program introduced into the computing platform by an attacker (who may or may not be the authorized user of the computing platform) to perform a user-level or kernel-level attack on the platform. In some attacks, the rootkit may become embedded within or hidden in the OS through various techniques. A second partition, called a security partition, executing at a higher privilege level than the user partition, may be included in VM J 132 and may be used to run anti-rootkit security monitor 128 to attempt to detect the presence and/or activities of the rootkit. Running the security partition at a higher privilege level from the primary partition may be facilitated either by running cooperatively with the VMM or by enhancing the underlying virtualization hardware architecture to define additional privilege levels (beyond those as may be defined in an implementation of Virtualization Technology available from Intel Corporation). Because the anti-rootkit security monitor is in the security partition, and the rootkit is in the user partition, the rootkit cannot affect the operation of the anti-rootkit security monitor. The security partition comprises a highly privileged partition that can register for notification of actions that may be used by rootkits that cause virtualization technology traps. Minimal virtual device support is required for the security partition.

In one embodiment, the anti-rootkit security monitor may reside in, or as part of, the VMM, instead of in the security partition. In another embodiment, the anti-rootkit security monitor runs in the security partition but is dynamically linked with the VMM. In yet another embodiment, the security partition may be run as a deprivileged partition and the anti-rootkit security monitor may register for a callback with the VMM when traps of interest to the anti-rootkit security monitor occur.

While FIG. 1 illustrates execution environments being partitions as virtual machines, other embodiments may provide different execution environments through other mechanisms, e.g., using a service processor, and/or an embedded microcontroller. In various embodiments, an auxiliary environment may be partitioned from a host environment via a variety of different types of partitions, including a virtualized partition (e.g., a virtual machine in a Virtualization Technology (VT) scheme), as shown above, and/or an entirely separate hardware partition (e.g., utilizing Active Management Technologies (AMT), "Manageability Engine" (ME), Platform Resource Layer (PRL) using sequestered platform resources, System Management Mode (SMM), and/or other comparable or similar technologies), or may be executed on a different computing platform. In various embodiments, a VT platform may also be used to implement AMT, ME, and PRL technologies.

Figure 2:
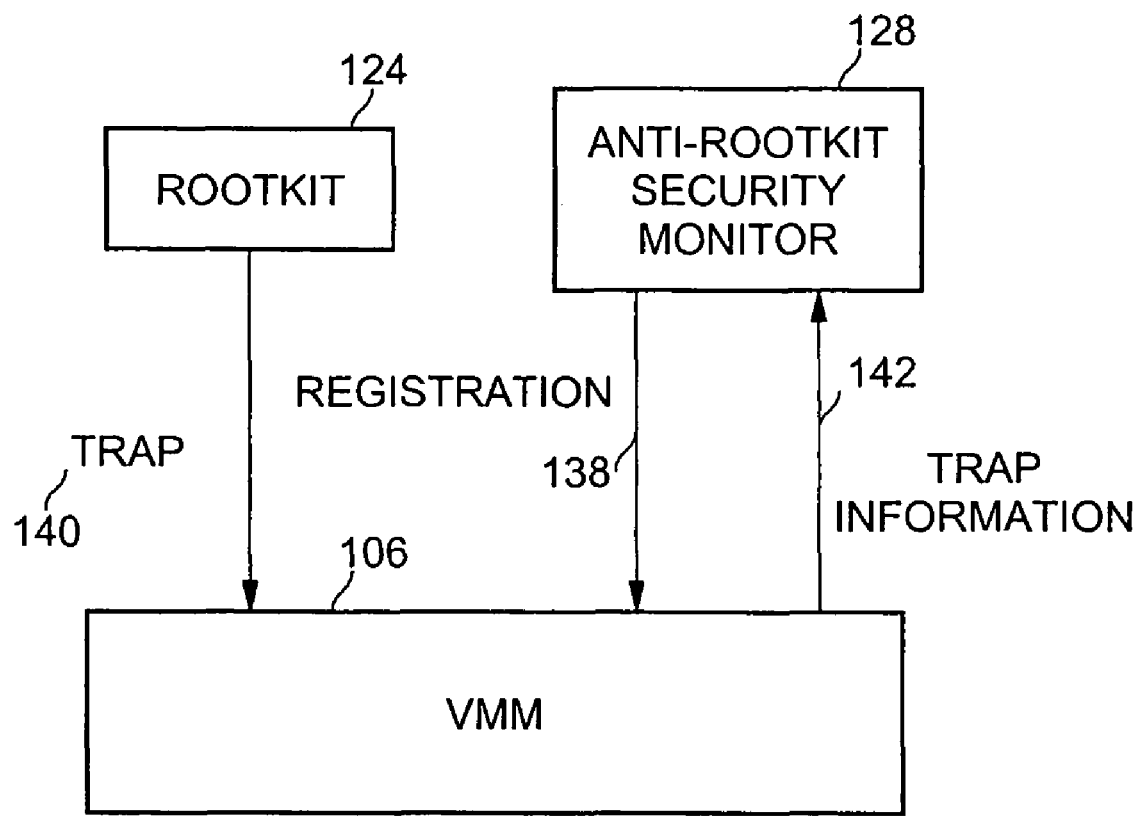
FIG. 2 illustrates a trap from a rootkit to the virtual machine monitor (VMM) in accordance with an embodiment of the present invention.

FIG. 2 is a diagram illustrating traps into the VMM. After the security partition is launched and the anti-rootkit security monitor is operational, the anti-rootkit security monitor sends registration information 138 to the VMM so that the VMM knows when to send trap information to the anti-rootkit security monitor for analysis. In embodiments of the present invention, some actions by the rootkit cause a trap 140 (e.g., a VM Exit) to the VMM 106. At the time of the trap, the processor has state information as to why control was transferred from to the VMM. As part of the handling of the trap, if the trap matches the registration characteristics for the anti-rootkit security monitor 128, the VMM sends trap information 142 to the anti-rootkit security monitor. The trap information may include information describing the action attempted or taken by the rootkit. The anti-rootkit security module analyzes the trap information and determines the appropriate course of action to take, if any. Thus, embodiments of the present invention take advantage of the trapping aspects of the virtualization technology architecture to detect rootkits, and utilize the higher privilege level of the VMM (often in cooperation with an additional partition such as the security partition) to prevent a rootkit from hiding by executing at the same privilege level as the anti-rootkit security monitor module.

There are many possible actions taken by, or attempted to be taken by, the rootkit that may cause the trap. In one example, one of the control registers of the processor may be modified by the rootkit. For example, in processors commercially available from Intel Corporation, a control register 0 contains bits that control how the processor behaves with respect to memory. A certain bit in control register 0 (called a Write Protect (WP) bit) may be used by an operating system such as Windows (available from Microsoft Corporation) to lock or unlock memory accesses. The WP bit controls whether the processor will allow writes to memory pages marked as read-only. Setting WP to zero disables memory protection. This is very important for some kernel mode rootkits that are intended to write to OS data structures. Thus, one method for disabling memory access protection in the kernel by a rootkit involves modifying this bit in control register 0.

If the attempt to write the WP bit of control register 0 may be detected by the anti-rootkit security monitor by way of a virtualization trap as describe above, overall security of the computing platform may be enhanced. In one embodiment, a virtual control register 0 may be simulated and exposed to the guest OS 126. When an attempt to write the WP bit is made, a virtualization trap occurs and the anti-rootkit security monitor is notified. The anti-rootkit security monitor may employ heuristics to make a determination as to whether the proposed change the control register 0 is acceptable. If not, the proposed modification is denied.

Access to other control registers and register called the EFlags register may also be monitored.

In another example, an Interrupt Descriptor Table (IDT) is used to find a software function to handle an interrupt. Interrupts are used for a variety of low-level functions in a computing platform. For example, an interrupt is signaled whenever a keystroke is typed on a keyboard. The IDT typically is an array of entries, one for each interrupt. An Interrupt Descriptor Table Register (IDTR) stores the base address of the IDT. Each processor in a multi-processor system has its own IDTR, and its own IDT. When an interrupt occurs, the interrupt number is obtained from the interrupt instruction, or from a programmable interrupt controller (PIC). In either case, the IDT is used to find the appropriate software function to call to handle the interrupt. This function is sometimes called an interrupt service routine (ISR). When the processor is in protected mode, the IDT is an array of 256 eight-byte entries. Each entry has the address of the ISR and some other security-related information.

One trick employed by rootkits is to create a new IDT that can be used to hide modifications to the original IDT. In the prior art, a virus scanner may check the integrity of the original IDT, but a rootkit can make a copy of the IDT, change the IDTR, and then make modifications to the copied IDT without detection.

In an embodiment of the present invention, any attempt to access the IDT may be caught via a virtualization trap. The trap information may be forwarded to the anti-rootkit security monitor to determine whether to allow the access by the user partition.

Figure 3:
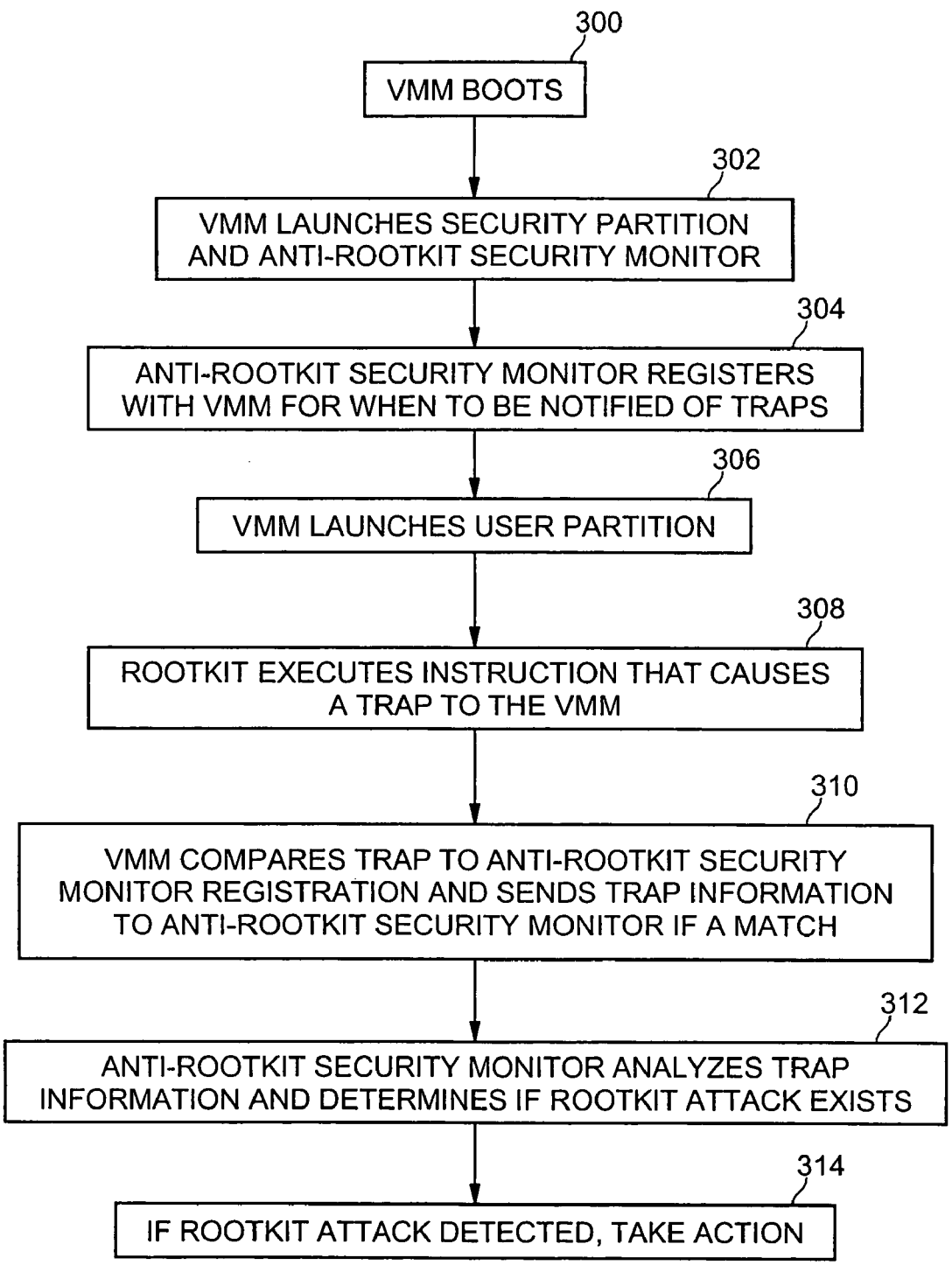
FIG. 3 is a flow diagram illustrating a process for kernel mode rootkit event trapping according to an embodiment of the present invention.

FIG. 3 is a flow diagram illustrating kernel mode rootkit event trapping according to an embodiment of the present invention. As part of the booting the computing platform, the VMM also boots at block 300. The VMM launches security partition 132 and the anti-rootkit security monitor module 128 running within the security partition at block 302. At block 304, the anti-rootkit security monitor registers with the VMM to subscribe to rules governing when to notify the anti-rootkit security monitor of events occurring on the computing platform causing virtualization traps. Some examples of rules include notifying the anti-rootkit security monitor when any change is made to control register 0, execution of any load IDT (LIDT) or store IDT (SIDT) instruction, and changes to system state based on a combination of factors (e.g., control register 0 is changed after five seconds of a partition boot). One skilled in the art will recognize that many rules are possible in the context of a computing platform.

At block 306, the VMM launches user partition 130. In some embodiments, multiple user partitions may be launched. Once the user partition is launched, at some point in time code in the rootkit 124 may be executed. The rootkit may cause the processor to execute an instruction that causes a virtualization trap to the VMM at block 308. At block 310, the VMM processes the trap in part by comparing the trap to the registration completed earlier by the anti-rootkit security monitor. If the trap matches an event of which the anti-rootkit security monitor should be notified, VMM sends trap information to the anti-rootkit security monitor. The trap information may include information such as guest state, memory pages near the trap, and amount of time that the user partition is running. One skilled in the art will recognize that any information related to the rootkit, the user partition, the current processor state, the IDT, or other system information may be sent to the anti-rootkit security monitor for analysis.

At block 312, the anti-rootkit security monitor analyzes the trap information received from the VMM and determines if the trap was caused by a rootkit or is benign. Many techniques now known or hereafter developed for analyzing the trap information may be used within the scope of the present invention. If a rootkit is detected, then action may be taken at block 314 in response to the rootkit attack. For example, the user partition may be halted, execution of a specific instruction by the processor may be blocked, the attack attempt may be logged, an alert may be sent to an external entity or system administrator console or to an active management technologies (AMT) module, or other anti-rootkit actions.

In one embodiment, after the user partition is launched at block 306, a legitimate guest OS in the user partition may communicate with the anti-rootkit security monitor executing in the security partition to assist in making the analysis of block 312 more accurate. For example, the guest OS could inform the anti-rootkit security monitor that the system tables and control register 0 have been initialized and any further modifications to specified data structures and registers are to be considered to be rootkit activity.

Embodiments of the present invention describe a powerful method and architecture for rootkit detection in that the embodiments utilize the higher privilege level of the VMM and/or the security partition to overcome hiding techniques used in kernel mode rootkits. Additionally, embodiments of the present invention allow for trapping on specific actions that are typical of rootkits that were not trappable in prior art processor architectures. These traps may be analyzed when they occur, as compared to repetitive scanning of the system state and memory contents as in prior art approaches to virus detection.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method of comprising:
   detecting, by a virtual machine monitor, a virtualization trap occurring as a result of an action by a rootkit executing in a computing system; and
   analyzing the virtualization trap to detect the presence of the rootkit in the computing system,
   wherein the virtual machine monitor is to execute at a higher privilege level, in cooperation with a separate partition, than the rootkit to prevent the rootkit from hiding by executing at a same privilege level as the virtual machine monitor.

2. The method of claim 1, further comprising:
   receiving registration from an anti-rootkit security monitor to be notified of the occurrence of selected virtualization traps;
   sending information relating to the virtualization trap to the anti-rootkit security monitor when the virtualization trap matches the registration; and
   wherein analyzing the virtualization trap to detect the presence of the rootkit in the computing system includes analyzing the trap information by the anti-rootkit security monitor.

3. The method of claim 2, wherein the anti-rootkit security monitor executes at a higher privilege level than the rootkit.

4. The method of claim 1, wherein the anti-rootkit security monitor and the rootkit execute in different partitions of the computing system.

5. The method of claim 4, wherein the rootkit executes in a user partition, the anti-rootkit security monitor executes in a security partition, and the rootkit cannot affect operation of the anti-rootkit security monitor.

6. The method of claim 5, further comprising launching the security partition before launching the user partition.

7. The method of claim 5, further comprising taking action against the rootkit when the rootkit is detected.

8. The method of claim 7, wherein the action comprises at least one of halting execution of the user partition, blocking execution of an instruction of the rootkit by a processor of the computing system, logging the rootkit action, and sending an alert to a system administrator console of the computing system.

9. The method of claim 4, wherein the partitions are implemented as virtual machines.

10. The method of claim 1, wherein the rootkit action comprises modifying a control register of a processor of the computing system or accessing an Interrupt Descriptor Table (IDT) of the computing system.

11. An article comprising: a storage device to store instructions, which when executed by a processor, result in detecting, by a virtual machine monitor, a virtualization trap occurring as a result of an action by a rootkit executing in a computing system; and
    analyzing the virtualization trap to detect the presence of the rootkit in the computing System,
    wherein the virtual machine monitor is to execute at a higher privilege level, in cooperation with a separate partition, than the rootkit to prevent the rootkit from hiding by executing at a same privilege level as the virtual machine monitor.

12. The article of claim 11, further comprising instructions to
    receive registration from an anti-rootkit security monitor to be notified of the occurrence of selected virtualization traps;
    send information relating to the virtualization trap to the anti-rootkit security monitor when the virtualization trap matches the registration; and
    wherein analyzing the virtualization trap to detect the presence of the rootkit in the computing system includes analyzing the trap information by the anti-rootkit security monitor.

13. The article of claim 12, wherein the anti-rootkit security monitor executes at a higher privilege level than the rootkit.

14. The article of claim 11, wherein the anti-rootkit security monitor and the rootkit execute in different partitions of the computing system.

15. The article of claim 14, wherein the rootkit executes in a user partition, the anti-rootkit security monitor executes in a security partition, and the rootkit cannot affect operation of the anti-rootkit security monitor.

16. The article of claim 15, further comprising launching the security partition before launching the user partition.

17. The article of claim 15, further comprising instructions for taking action against the rootkit when the rootkit is detected.

18. The article of claim 17, wherein the action comprises at least one of halting execution of the user partition, blocking execution of an instruction of the rootkit by a processor of the computing system, logging the rootkit action, and sending an alert to a system administrator console of the computing system.

19. The article of claim 14, wherein the partitions are implemented as virtual machines.

20. The article of claim 11, wherein the rootkit action comprises modifying a control register of a processor of the computing system or accessing an Interrupt Descriptor Table (IDT) of the computing system.

21. A computing system comprising:
    a virtual machine monitor adapted to detect a virtualization trap occurring as a result of an action by a rootkit, to receive a registration for notification of occurrence of selected virtualization traps, and to send information relating to the virtualization trap when the virtualization trap matches the registration; and
    an anti-rootkit security monitor adapted to register to be notified of the occurrence of selection virtualization traps, to receive the trap information, and to analyze the trap information to detect the presence of the rootkit in the computing system,
    wherein the virtual machine monitor is to execute at a higher privilege level, in cooperation with a separate partition, than the rootkit to prevent the rootkit from hiding by executing at a same privilege level as the anti-rootkit security monitor.

22. The computing system of claim 21, wherein the anti-rootkit security monitor and the rootkit execute in different partitions of the computing system.

23. The computing system of claim 22, wherein the rootkit executes in a user partition, the anti-rootkit security monitor executes in a security partition, and the rootkit cannot affect operation of the anti-rootkit security monitor.

24. The computing system of claim 23, wherein the virtual machine monitor is adapted to launch the security partition before launching the user partition.

25. The computing system of claim 23, wherein the anti-rootkit security monitor takes action against the rootkit when the rootkit is detected.

26. The computing system of claim 22, wherein the partitions are implemented as virtual machines supported by the virtual machine monitor.

27. The computing system of claim 22, wherein the anti-rootkit security monitor executes at a higher privilege level than the rootkit.

* * * * *